4 Sheets—Sheet 1.

L. DE LACEE.
HAY LOADER.

No. 64,848. Patented May 21, 1867.

Witnesses.
Theo Tusche
J. A. Service

Inventor.
Leopold DeLacee
Per Munn & Co
Attorneys.

4 Sheets—Sheet 3.

L. DE LACEE.
HAY LOADER.

No. 64,848.  Patented May 21, 1867.

Witnesses,
Theo. Tusch
J. A. Service

Inventor.
Leopold DeLacee
Per Munn &
Attorneys

4 Sheets—Sheet 4.

L. DE LACEE.
HAY LOADER.

No. 64,848. Patented May 21, 1867.

Witnesses. Inventor.

United States Patent Office.

LEOPOLD DE LACEE, OF SPRINGFIELD, ILLINOIS.

*Letters Patent No. 64,848, dated May 21, 1867.*

IMPROVEMENT IN HAY-LOADERS.

The Schedule referred to in these Letters Patent and making part of the same.

TO ALL WHOM IT MAY CONCERN:

Be it known that I, LEOPOLD DE LACEE, of Springfield, in the county of Sangamon, and State of Illinois, have invented a new and improved Machine for Raking and Pitching or Loading Hay and Grain, and that the following description, taken in connection with the accompanying drawings hereinafter referred to, forms a full and exact specification of the same, wherein I have set forth the nature and principles of my said improvements by which my invention may be distinguished from all others of a similar class, together with such parts as I claim and desire to have secured to me by Letters Patent.

This invention relates to a new and improved machine for raking and pitching hay and grain from the field as left by the mowing or reaping machine, and depositing the hay or grain upon wagons or carts, thereby enabling the farmer, with the aid of one or two men, to safely harvest and put under cover in a given time as much hay or grain as can be cut by two machines.

A vast amount of hay and grain is annually damaged, and much completely destroyed by long exposure to the elements after being cut by machines, on account of the inability of the farmer, with the present means of raking and pitching, to secure his crops or harvest the same with sufficient rapidity. Besides the advantage of rapidity in gathering crops, my machine possesses that of economy to the grass and grain grower, dispensing with the large force of hands that heretofore have been necessary during the harvest season in order to rake, bind, pitch, &c., &c., and substituting therefor a machine, simple in construction, built principally of wood, and which may be cheaply constructed, and repaired, when necessary, by any farmer of ordinary ability. In the accompanying drawings—

Figure 1:
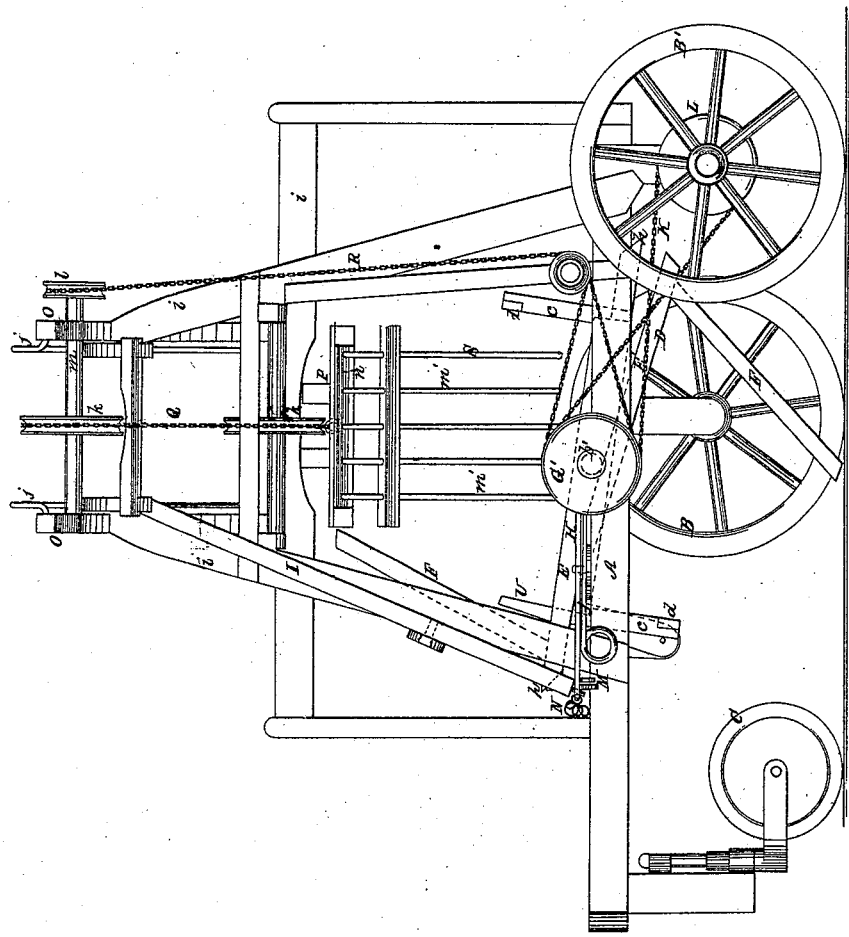
Figure 2:
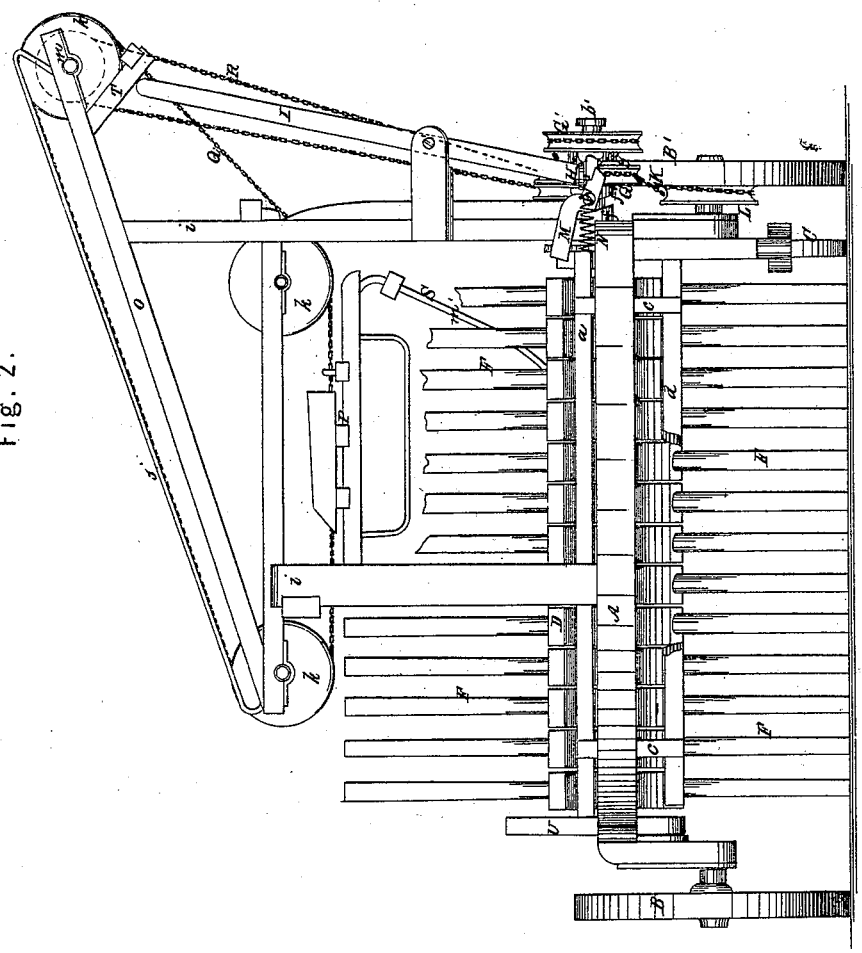
Figure 3:
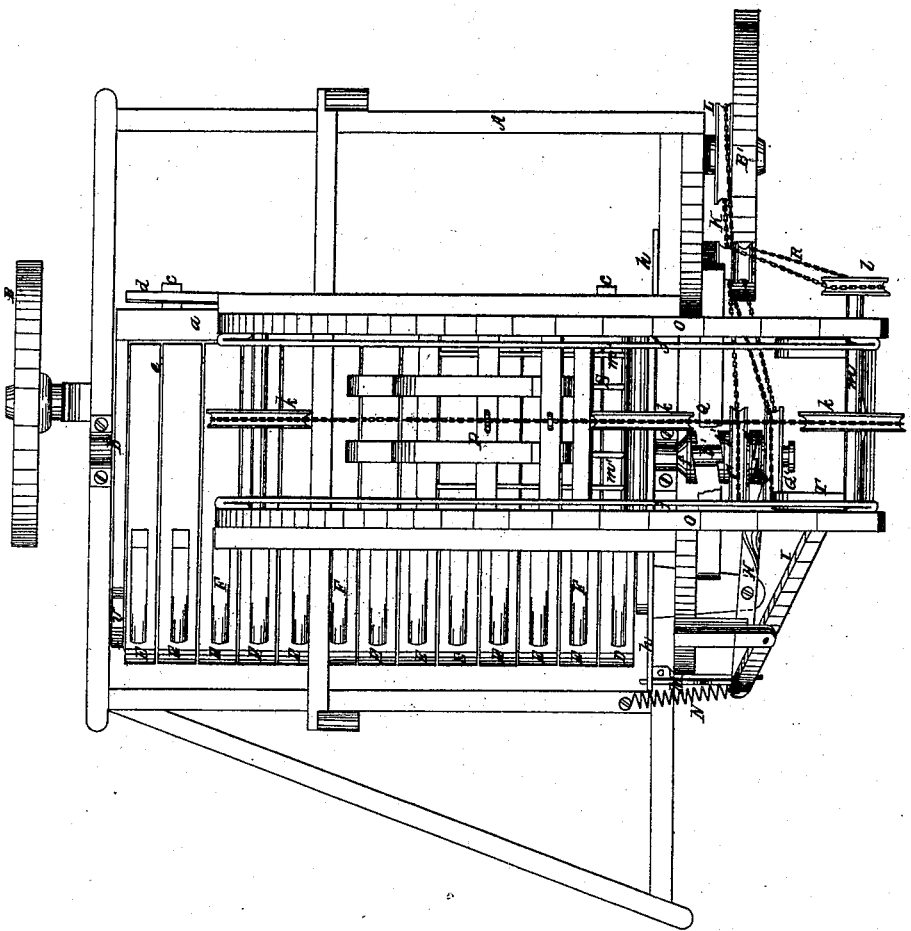
Figure 7:
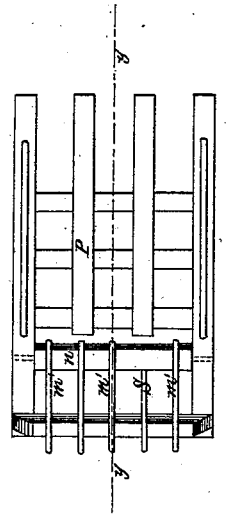
Figure 5:
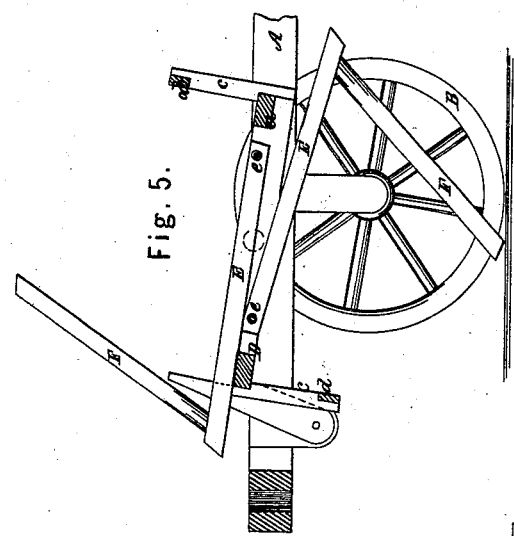
Figure 6:
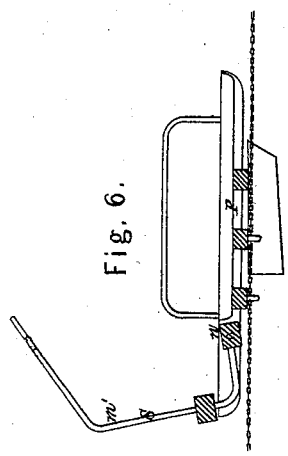
Figure 4:
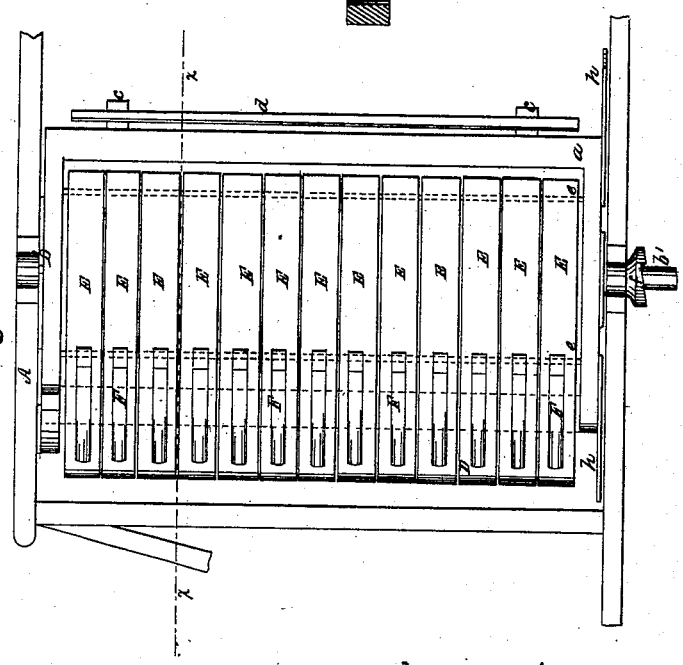

Figure 1, Sheet No. 1, is a side view of my invention.
Figure 2, a front view of the same.
Figure 3, Sheet No. 2, a plan or top view of the same.
Figure 4, a detached plan or top view of the raking device pertaining to the same.
Figure 5, a transverse section of fig. 4, taken in the line $x\ x$.
Figure 6, a detached side sectional view of the pitching or discharging fork pertaining to the invention, taken in the line $y\ y$, fig. 7; and
Figure 7, a plan or top view of the fork.
Similar letters of reference indicate corresponding parts.

A represents the main frame of the apparatus, which is mounted upon wheels B B' C, the latter being a caster-wheel, and at the front part of the frame, to admit of the machine freely turning in any direction. D is a revolving platform and rake, composed of a rectangular frame, $a$, hung upon journals $b\ b'$, in the frame A, and allowed to turn freely therein, (see more particularly figs. 4 and 5.) At both sides of this frame $a$ there are secured two bars, $c\ c$, the ends of which are connected by a cross-bar, $d$. These bars $c$ project from opposite sides of the frame $a$, as shown in fig. 5. In the frame $a$ there are placed two longitudinal parallel rods, $e\ e$, one near each side thereof, and on these rods there are fitted loosely bars E, with rake teeth F framed into them, one in each, in an angular or oblique position, as shown clearly in fig. 5. On the journal $b'$ of the frame $a$, one part, $f$, of a clutch is keyed or otherwise secured, the other part, $f'$, of said clutch being at one side of a pulley, G, which is placed loosely on the journal $b'$. Another pulley, G', is also placed loosely on the journal $b'$, and the two pulleys G G', when adjusted towards each other, are connected by a clutch, the two parts $g\ g$ of which are secured to or formed one on each of said pulleys, (see fig. 3.) The pulley G is moved by a pivoted bar, H, having an upright lever, I, attached to its front end, and the pulley G' is moved by a lever, J, pivoted to the under side of the bar H, (see fig. 1.) The pulley G is driven or rotated by a cross-chain or belt, K, from a pulley, L, attached rigidly and concentrically to the wheel B', and when pulley G is connected with the journal $b'$, by operating the lever I it is held in connection with said journal by means of a pivoted bar, M, having a notch at its outer end against which the outer end of the bar H catches. When the inner end of this bar M is thrown upward, the bar H is released from the outer end of M, and H is actuated by a spring, N, to throw the part $f'$ of the clutch on pulley G out from the other part $f$ on the journal $b'$, and thereby disconnect G from $b'$. On one end of the frame $a$ there are two arms, $h\ h$, which act against the pivoted bar M, as will be hereinafter described. O O are two inclined bars, secured by suitable supports $i$, some distance above the frame A, in an inclined position relatively therewith. On these bars O O there are secured metal rods $j$, one on each, which serve as ways or guides for a carriage, P, the latter being attached to an endless chain, Q, which works over suitable pulleys, $k$. This chain Q is operated from the pulley G′, a chain, R, passing around the same and over a pulley, $l$, on a shaft, $m$, on which one of the pulleys $k$ is keyed, (see figs. 1, 2, and 3.) S is a pitching fork, which is composed of a series of teeth or arms, $m'$, curved or bent in proper form, and attached at one end to a shaft, $n$, in the carriage P. This pitching fork also performs the function of a rake, as will be presently shown.

The operation is as follows: The machine is attached to the side of a wagon by means of a chain or other suitable means, and when drawn over the field motion is given the revolving platform and raking device D from the wheel B′ by the chain K. The teeth F of the two series of bars E alternately rake up the cut hay or grain, while the bars E of the teeth F, which are uppermost and inoperative, serve as a platform on which the elevated teeth, as they assumed their elevated position, deposited the hay or grain raked up by them, and from which platform the fork S rakes up the hay or grain, and deposits it into the wagon, the fork discharging its load while passing over or around the pulley $k$ on shaft $m$, and the fork at this time closing or dropping by its own gravity over the carriage in order not to interfere with the wagon, the workman thereon, or with any portion of the load. As the carriage turns over this pulley $k$, it comes in contact with a swinging frame, T, attached to the inclined bars O O, and by moving this frame actuates the lever I, and throws the pulley G in connection with the journal $b'$, so that the frame $a$ will make a half revolution, the lower teeth F with their load being thereby elevated, and the hay or grain thrown upon the bars E of the other teeth, which, as before stated, serve as a platform for the fork S to rake up the hay or grain from. The frame $a$ is stopped as it arrives at a half revolution, in consequence of one of the arms $h$ striking the pivoted bar M, and releasing the bar H, so that the spring N may move pulley G and disconnect it from the journal $b'$. By this half revolution of the frame $a$, the teeth, which were elevated at the commencement of its movement, are turned down to a working position, while those which were at work are turned upward with their load. The fork S has a continuous movement as the pulley G′, which drives it by means of the chain R, is connected with pulley G, but the fork may be rendered inoperative when desired by disconnecting G′ from G through the medium of lever J, which, when the machine is at work, is connected with the bar H by means of a pin. In drawing the machine from place to place, the frame $a$ is raised and made to rest upon a bar, U, so that the lower rake teeth will be clear from the surface of the ground.

Having thus described my invention, I claim as new, and desire to secure by Letters Patent—

1. The revolving platform and raking device D, composed of the frame $a$ fitted in the main frame A, and provided with the bars E, having teeth F attached, all arranged substantially as and for the purpose specified.

2. The raking and pitching fork S, attached to a carriage, P, operated by an endless chain, Q, and arranged with ways or guides $j\,j$, on a suitable framing or support, substantially as and for the purpose set forth.

3. The swinging or pendent frame T, in combination with the lever I, bar H, and clutch pulley G, arranged to operate in connection with the revolving platform and raking device, substantially as and for the purpose specified.

4. The two pulleys G G′, connected by a clutch, and arranged as shown, to operate respectively the revolving platform and raking device, and the raking and pitching fork, substantially as shown and described.

LEOPOLD DE LACEE.

Witnesses:
  A. MILLER,
  J. H. KENT.